US011504750B2

(12) United States Patent
Takeuchi et al.

(10) Patent No.: US 11,504,750 B2
(45) Date of Patent: Nov. 22, 2022

(54) TURBINE BLADE MAINTENANCE METHOD

(71) Applicant: Mitsubishi Hitachi Power Systems, Ltd., Kanagawa (JP)

(72) Inventors: Yasushi Takeuchi, Kanagawa (JP); Yosuke Kawachi, Kanagawa (JP); Yoshiyuki Inoue, Kanagawa (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 947 days.

(21) Appl. No.: 15/747,530

(22) PCT Filed: Dec. 13, 2016

(86) PCT No.: PCT/JP2016/087066
§ 371 (c)(1),
(2) Date: Jan. 25, 2018

(87) PCT Pub. No.: WO2017/115643
PCT Pub. Date: Jul. 6, 2017

(65) Prior Publication Data
US 2018/0207689 A1    Jul. 26, 2018

(30) Foreign Application Priority Data
Dec. 28, 2015  (JP) .............................. JP2015-256927

(51) Int. Cl.
*B08B 3/08* (2006.01)
*B08B 3/12* (2006.01)
(Continued)

(52) U.S. Cl.
CPC ................. *B08B 3/08* (2013.01); *B08B 3/02* (2013.01); *B08B 3/12* (2013.01); *B08B 9/0321* (2013.01);
(Continued)

(58) Field of Classification Search
CPC .... B08B 3/08; B08B 3/02; B08B 3/12; B08B 9/0321; B08B 2209/005; B08B 2209/032;
(Continued)

(56) References Cited

U.S. PATENT DOCUMENTS 5,507,306 A   4/1996  Irvine et al.
6,174,380 B1 * 1/2001  Rosenzweig ............ C23G 1/00
                                                              134/1
(Continued)

FOREIGN PATENT DOCUMENTS

EP    1 286 020    2/2003
EP    1 387 040    2/2004
(Continued)

OTHER PUBLICATIONS

International Search Report dated Mar. 7, 2017 in International (PCT) Application No. PCT/JP2016/087066.
(Continued)

*Primary Examiner* — Alexander Markoff
(74) *Attorney, Agent, or Firm* — Wenderoth, Lind & Ponack, LLP

(57) ABSTRACT

A cleaning process (blasted-particles cleaning process) includes performing, a plural number of consecutive cycles, an ultrasonic cleaning treatment including immersing a turbine rotor blade in a water basin and conducting an ultrasonic wave into the water basin to clean the turbine rotor blade, and a pressurized-water cleaning treatment including spraying pressurized water into an internal cooling flow channel after the ultrasonic cleaning treatment is performed. The cleaning process is performed after a bonding coat layer removing process of removing a bonding coat layer (first coating layer) by chemical treatment, and a cleaning process of cleaning the turbine blade by blast treatment. Heat tinging process is then performed.

4 Claims, 4 Drawing Sheets

(51) Int. Cl.
    *B08B 3/02*        (2006.01)
    *B08B 9/032*     (2006.01)
    *F01D 5/00*       (2006.01)
    *F01D 25/00*     (2006.01)
    *F01D 5/18*       (2006.01)
    *F01D 5/28*       (2006.01)
    *B24C 1/00*       (2006.01)
    *F02C 7/00*       (2006.01)
    *F02C 7/18*       (2006.01)

(52) U.S. Cl.
    CPC ............... *B24C 1/00* (2013.01); *F01D 5/005* (2013.01); *F01D 5/18* (2013.01); *F01D 5/28* (2013.01); *F01D 25/00* (2013.01); *F01D 25/002* (2013.01); *F02C 7/00* (2013.01); *F02C 7/18* (2013.01); *B08B 2209/005* (2013.01); *B08B 2209/032* (2013.01); *F05D 2230/40* (2013.01); *F05D 2230/72* (2013.01); *F05D 2230/90* (2013.01); *F05D 2240/307* (2013.01)

(58) Field of Classification Search
    CPC ... B24C 1/00; F01D 5/005; F01D 5/18; F01D 5/28; F01D 25/00; F01D 25/002; F01D 5/187; F02C 7/00; F02C 7/18; F05D 2230/40; F05D 2230/72; F05D 2230/90; F05D 2240/307
    See application file for complete search history.

(56) References Cited

U.S. PATENT DOCUMENTS

| | | | |
|---|---|---|---|
| 2002/0074240 A1* | 6/2002 | Jaworowski | C25F 1/00 |
| | | | 205/673 |
| 2003/0037436 A1* | 2/2003 | Ducotey, Jr. | B23H 9/10 |
| | | | 29/889.1 |
| 2003/0062271 A1* | 4/2003 | Kool | C25F 5/00 |
| | | | 205/717 |
| 2003/0148710 A1* | 8/2003 | Esser | B23P 6/002 |
| | | | 451/39 |
| 2005/0035086 A1* | 2/2005 | Chen | C23C 4/00 |
| | | | 216/83 |
| 2007/0125459 A1 | 6/2007 | Gupta et al. | |
| 2008/0028605 A1 | 2/2008 | Lutz et al. | |
| 2008/0241370 A1* | 10/2008 | Topa | B24B 31/00 |
| | | | 427/142 |
| 2010/0326466 A1* | 12/2010 | Kawakami | F01D 5/005 |
| | | | 134/3 |
| 2013/0295278 A1* | 11/2013 | Zhang | C23C 10/60 |
| | | | 427/142 |
| 2018/0236503 A1* | 8/2018 | Uemura | B24C 1/00 |

FOREIGN PATENT DOCUMENTS

| | | |
|---|---|---|
| EP | 1 437 425 | 7/2004 |
| EP | 2 107 370 | 10/2009 |
| EP | 2 241 727 | 10/2010 |
| JP | 10-317988 | 12/1998 |
| JP | 2003-155935 | 5/2003 |
| JP | 2008-031999 | 2/2008 |
| JP | 2012-062834 | 3/2012 |
| WO | 2009/101690 | 8/2009 |

OTHER PUBLICATIONS

Written Opinion of the International Searching Authority dated Mar. 7, 2017 in International (PCT) Application No. PCT/JP2016/087066, with English Translation.

Notification of Reason for Refusal dated Apr. 5, 2019 in corresponding Korean Patent Application No. 10-2018-7002355 with machine translation.

Extended European Search Report dated Sep. 6, 2018 in European Application No. 16881622.1.

* cited by examiner

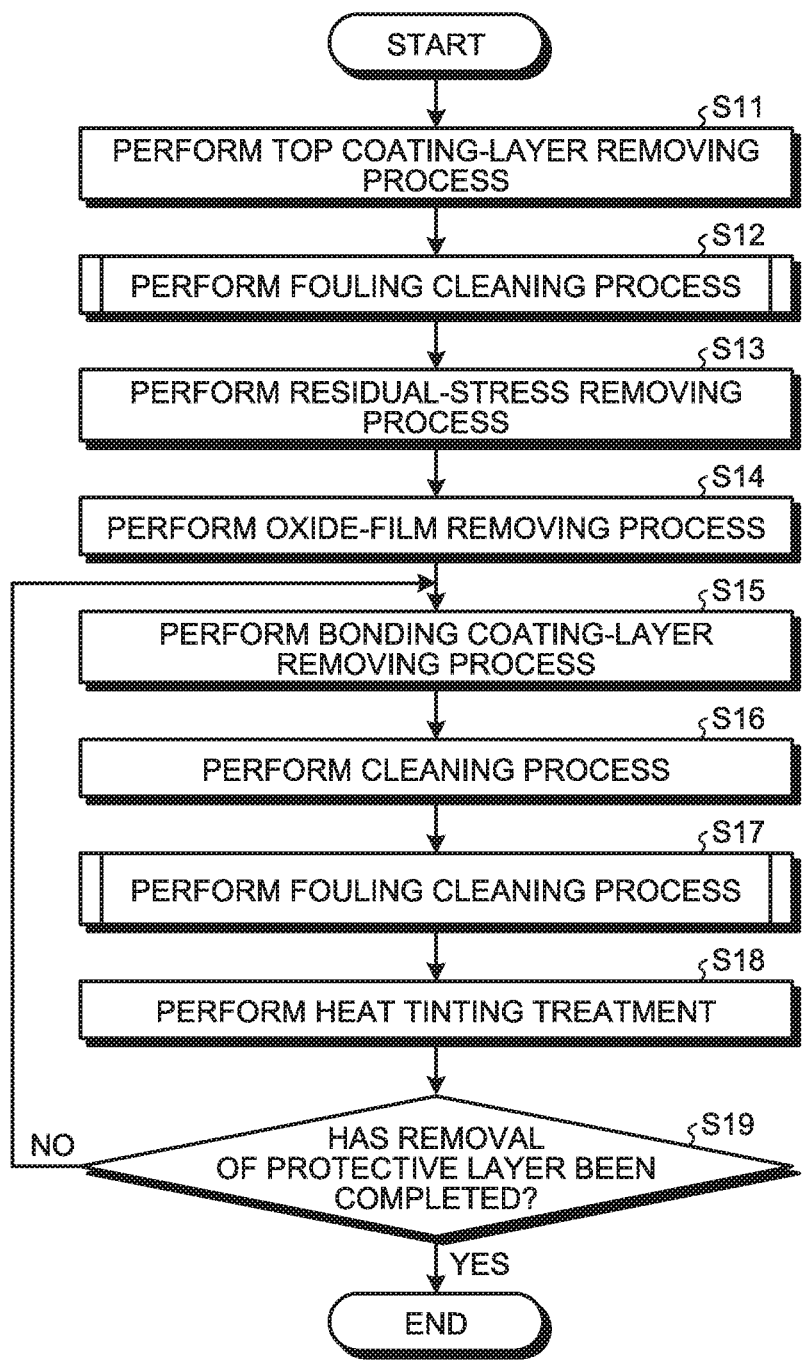

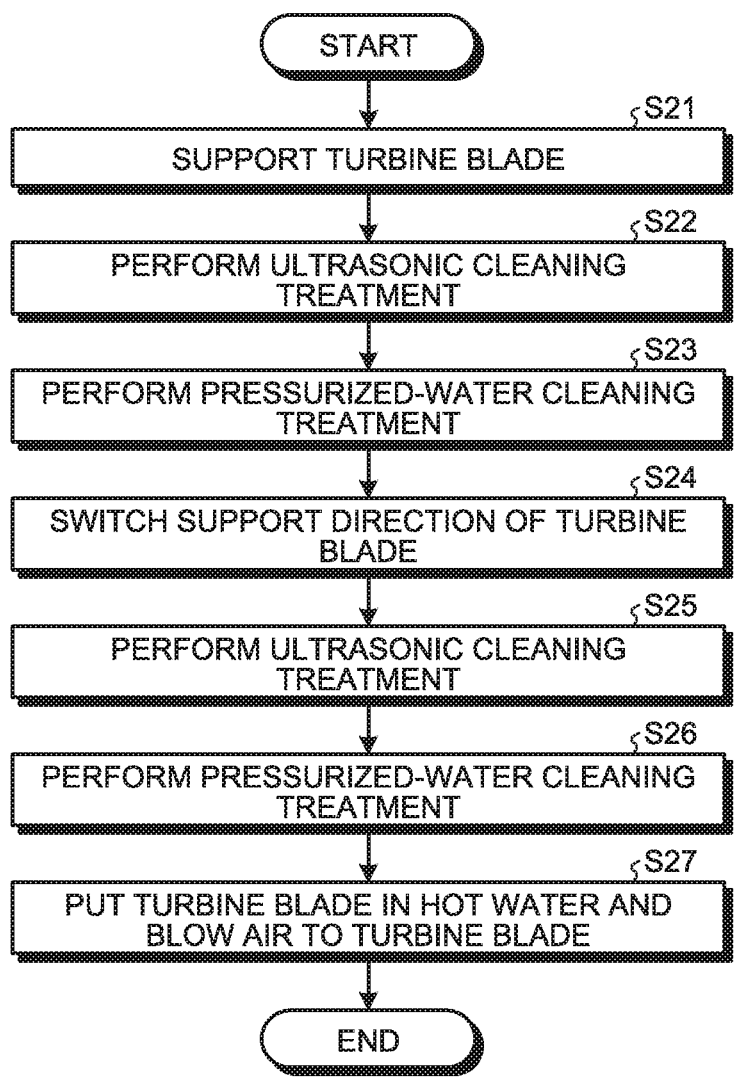

TURBINE BLADE MAINTENANCE METHOD

FIELD

The present invention relates to a turbine blade maintenance method that includes internal cooling flow channels for circulating a refrigerant.

BACKGROUND

Conventionally, as a maintenance method of this kind of turbine blade, there has been known such a technique that coating such as a metal bonding coating consisting of metallic coating applied to an external surface of the turbine blade and a ceramic topcoating consisting of ceramic coating applied to the outside of the metal bonding coating is removed once by chemical treatment or mechanical treatment, and new coating is applied thereto again. For example, Japanese Laid-open Patent Publication No. 2003-155935 (hereinafter JP 2003-155935) discloses a technique of removing ceramic topcoating by a known method such as autoclave and then immersing metal bonding coating in a stripping solution to remove the metal bonding coating. According to the turbine blade maintenance method described in JP 2003-155935, after the stripping treatment, the turbine blade is cleaned by grit blasting, and heat tinting test (heat tinting) for testing whether the metal bonding coating remains is further performed. When a series of processes for removing the coating (protective layer) is completed in this way, the turbine blade is sent to a maintenance process such as repair of damage and re-coating treatment for coating according to need.

The above-described grit blast treatment is performed for the purpose of removing a reactive layer generated on the blade surface due to the stripping solution and residues of the metal bonding coating to clean the turbine blade as pretreatment for the heat tinting test (heat tinting). However, there are some cases where part of blasted particles used in the blast treatment enters an internal cooling flow channel of the turbine blade and adheres to an inner wall surface by the stripping solution remaining in the internal cooling flow channel. Since the blast treatment and the heat tinting test (heat tinting) are the final treatment of the series of processes for removing the coating (protective layer) from the turbine blade, remaining of the blasted particles in the blade, the blasted particles having been generated in the final treatment, may cause troubles in maintenance work of the turbine blade and reinstallation work of a turbine blade after completion of the maintenance work.

The present invention has been achieved in view of the above problems, and a main object of the present invention is to, in a maintenance process of a turbine blade including internal cooling flow channels for circulating a refrigerant, more favorably remove blasted particles from an inside of a turbine blade during the period until a series of processes for removing a protective layer from the turbine blade is completed.

Summary of the Invention

To solve the above problems and achieve the object, a turbine blade maintenance method, the turbine blade including a first coating layer as a protective layer applied to an external surface and internal cooling flow channels for circulating a refrigerant, includes a first coating layer removing process where the first coating layer is removed by chemical treatment, a cleaning process where blast treatment for cleaning the turbine blade is performed after the first coating layer removing process, and after the cleaning process, a blasted-particles cleaning process where ultrasonic cleaning treatment in which the turbine blade is immersed in a water basin and ultrasonic sound waves are conducted into the water basin to clean the turbine blade, and pressurized-water cleaning treatment in which pressurized water is sprayed into the internal cooling flow channels after performing the ultrasonic cleaning treatment are performed at least once.

According to the turbine blade maintenance method of the present invention, a blasted-particles cleaning process is performed. In the blasted-particles cleaning process, the ultrasonic cleaning treatment in which the turbine blade is immersed in the water basin and ultrasonic sound waves are conducted into the water basin to clean the turbine blade, and pressurized-water cleaning treatment to spray pressurized water into the internal cooling flow channels after the ultrasonic cleaning treatment are performed at least once, after a first coating layer removing process of removing the first coating layer by chemical treatment and a cleaning process of cleaning the turbine blade by blast treatment. Accordingly, even if the blasted particles used for the blast treatment in the cleaning process enter the internal cooling flow channels of the turbine blade and adhere to an inner wall surface, the blasted particles can be peeled favorably from the inner wall surface of the internal cooling flow channels by the ultrasonic cleaning treatment. The blasted particles remaining in the internal cooling flow channels can be reliably removed by the pressurized-water cleaning treatment. Therefore, according to the present invention, in the maintenance process of the turbine blade including the internal cooling flow channels for circulating the refrigerant, the blasted particles can be more favorably removed from inside of the turbine blade during the period until the series of processes for removing a protective layer from the turbine blade is completed.

The turbine blade maintenance method according to the present invention may further include a heat tinting process where heat treatment for testing whether the first coating layer remains on the turbine blade is performed after the blasted-particles cleaning process.

In the turbine blade maintenance method according to the present invention, the turbine blade may be a rotor blade, the internal cooling flow channels may open in a blade tip and a blade root of the turbine blade, and in the pressurized-water cleaning treatment, pressurized water may be sprayed into the internal cooling flow channels from any one of the openings in the blade tip and the openings in the blade root. As a result, the blasted particles adhering to the internal cooling flow channels can be favorably removed evenly from the blade tip to the blade root.

In the turbine blade maintenance method according to the present invention, in the pressurized-water cleaning treatment, pressurized water may be sprayed from one of the openings in the blade tip and the openings in the blade root in a state where the turbine blade is supported so that a longitudinal direction is along the vertical direction, one of the openings being located on an upper side in a vertical direction. As a result, the blasted particles adhering to the internal cooling flow channels can be washed away from the upper side to a lower side in the vertical direction and removed favorably by spraying the pressurized water.

In the turbine blade maintenance method according to the present invention, in the blasted-particles cleaning process, after a support direction is switched so that upper and lower sides in the vertical direction of the turbine blade are inverted with respect to previous pressurized-water cleaning treatment, next pressurized-water cleaning treatment may be performed. As a result, when the pressurized-water cleaning treatment is performed plural times, the flow direction of the pressurized water to be supplied into the internal cooling flow channels can be changed. Accordingly, the blasted particles adhering to the internal cooling flow channels can be removed quite favorably.

In the turbine blade maintenance method according to the present invention, in the blasted-particles cleaning process, first pressurized-water cleaning treatment may be performed in a state where the turbine blade is supported so that the blade tip is on the upper side in the vertical direction. Accordingly, it can be suppressed more favorably that the blasted particles clog the internal cooling flow channels on the blade tip side, where the flow channels are generally narrowed down as compared with the blade root side.

The turbine blade maintenance method according to the present invention further includes a residual-stress removing process where heat treatment is performed so as to remove residual stress in the turbine blade before the first coating layer removing process, and before the residual stress removing process, a scale cleaning process where ultrasonic cleaning treatment and the pressurized-water cleaning treatment performed after the ultrasonic cleaning treatment are performed at least once.

According to the turbine blade maintenance method of the present invention, before the first coating layer removing process, the residual stress removing process of performing heat treatment to remove a stress remaining in the turbine blade is performed. Accordingly, occurrence of stress corrosion cracking in the turbine blade can be favorably prevented in the first coating layer removing process. Before the heat treatment for removing the residual stress is applied to the turbine blade, the scale cleaning process of performing, at least once, the ultrasonic cleaning treatment and the pressurized water cleaning treatment to be performed after the ultrasonic cleaning treatment is performed. Accordingly, water-soluble scale adhering to an outer periphery of the turbine blade and inner wall surfaces of the internal cooling flow channels can be peeled favorably by the ultrasonic cleaning treatment. The water-soluble scale remaining in the internal cooling flow channels can be reliably removed by the pressurized-water cleaning treatment. Therefore, according to the present invention, before applying the heat treatment to the turbine blade, water-soluble scale adhering to the turbine blade can be favorably removed by a simpler method.

In the turbine blade maintenance method according to the present invention, the turbine blade may include a second coating layer applied to outside of the first coating layer, and the turbine blade maintenance method may further include a second coating layer removing process for removing the second coating layer by blast treatment before the residual-stress removing process. Accordingly, the water-soluble scale adhering to the second coating layer is favorably removed together with the second coating layer by the blast treatment for removing the second coating layer before applying the heat treatment for removing the residual stress to the turbine blade. Meanwhile, water-soluble scale adhering to the outer periphery of the turbine blade and the internal cooling flow channels other than to the second coating layer, which cannot be removed by the blast treatment, is favorably removed by the scale cleaning process before applying the heat treatment for removing the residual stress to the turbine blade. In this manner, the turbine blade maintenance method according to the present invention is preferably applied to a turbine blade including the second coating layer. Either a second coating-layer removing process or the scale cleaning process can be performed first, so long as the process is performed before performing the residual-stress removing process.

Advantageous Effects of Invention

According to the turbine blade maintenance method of the present invention, it is possible to, in a maintenance process of the turbine blade including internal cooling flow channels for circulating a refrigerant, remove the blasted particles favorably from inside of the turbine blade during the period until the series of processes for removing a protective layer from the turbine blade is completed.

BRIEF DESCRIPTION OF DRAWINGS

FIG. 3 a flowchart illustrating an example of the protective layer removing process.

FIG. 4 a flowchart illustrating an example of a fouling cleaning process included in the protective-layer removing process.

DESCRIPTION OF EMBODIMENTS

Exemplary embodiments of a turbine blade maintenance method according to the present invention will be explained below in detail with reference to the accompanying drawings. The present invention is not limited to the embodiments.

Figure 1:
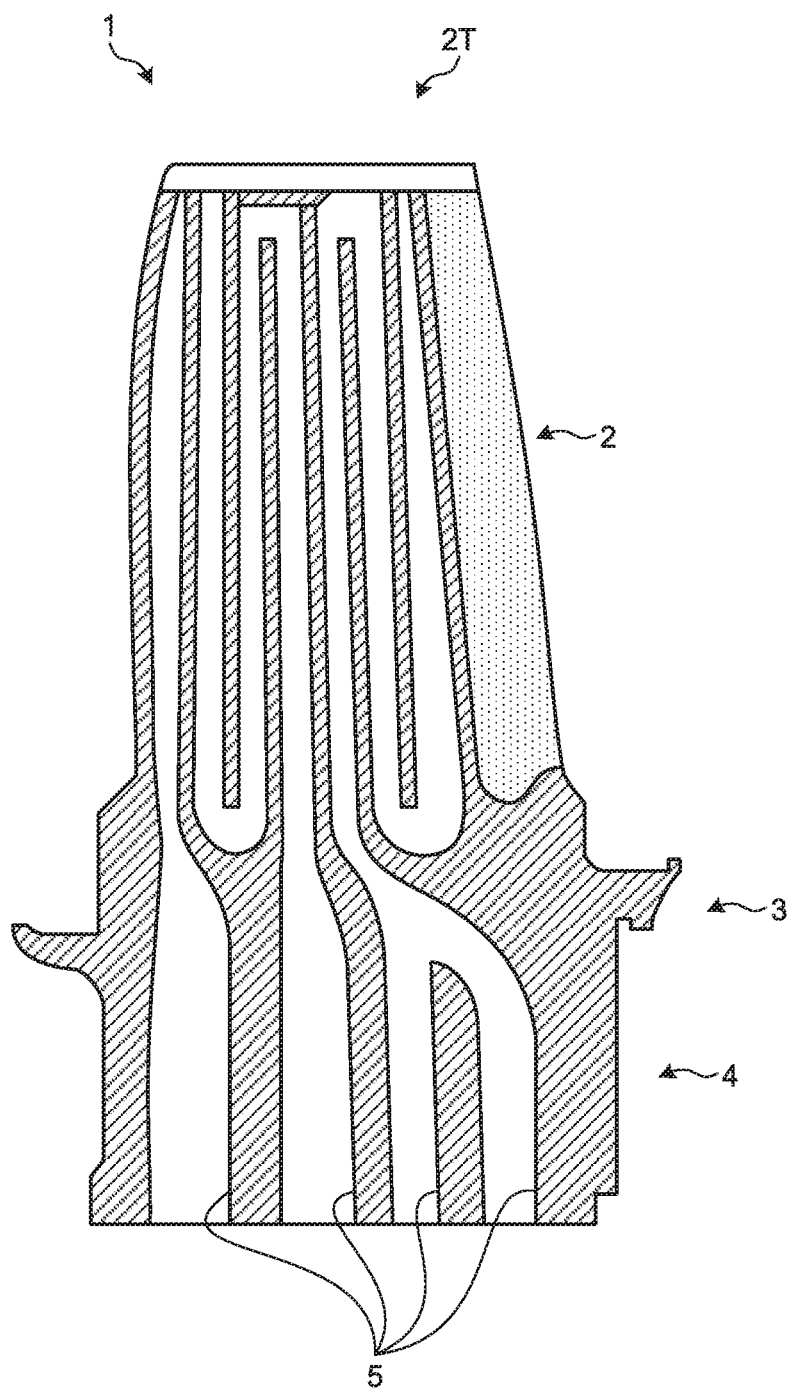
FIG. 1 is a sectional view illustrating a gas turbine rotor blade that is an object of a turbine blade maintenance method according to an embodiment of the present invention.

FIG. 1 is a sectional view illustrating a turbine blade 1 that is an object of a turbine blade maintenance method according to an embodiment of the present invention. The turbine blade 1 is a rotor blade to be used on front stages (for example, first and second stages) of a known gas turbine, and is arranged in a turbine chamber (not illustrated). However, the object of the turbine blade maintenance method according to the present invention is not limited to the turbine blade 1. For example, the object of the turbine blade maintenance method can be a turbine rotor blade installed on rear stages of the gas turbine, or a gas turbine vane, or a rotor blade or a turbine vane used in a steam turbine The turbine blade 1 includes, as illustrated in FIG. 1, a blade portion 2 that forms a profile, a platform 3 bonded with the blade portion 2, and a shank 4 extended from the platform 3 to the side opposite to the blade portion 2. On the side of the shank 4 opposite to the platform 3 (the lower side in FIG. 1), although not illustrated in FIG. 1, a blade root to be attached to a rotor disk of the gas turbine is formed.

In the turbine blade 1, a plurality of internal cooling flow channels 5 extending from a blade root (not illustrated) to a blade tip 2T being an end of the blade portion 2 are formed. As illustrated in FIG. 1, the internal cooling flow channels 5 are configured as serpentine flow channels, parts of which are formed so as to meander inside the blade portion 2. The internal cooling flow channels 5 respectively open in the blade root and the blade tip 2T, and cooling air is supplied into the internal cooling flow channels 5 via openings in the blade root from a rotor (not illustrated). The cooling air supplied into the internal cooling flow channels 5 passes through the shank 4, the platform 3, and the inside of the blade portion 2, and is discharged to the outside of the turbine blade 1 from the openings in the blade tip 2T and a plurality of outlet holes formed in a leading edge and a trailing edge (each of which is not illustrated) of the blade portion 2. Accordingly, the turbine blades 1 on the front stages, which are exposed to a high-temperature environment for a long period of time, can be cooled effectively. The openings in the blade root (not illustrated) can open downward in FIG. 1, or open in either direction of right and left in FIG. 1.

The turbine blade 1 configured in this matter includes a protective layer consisting of a bonding coating layer (first coating layer) coated on an outer periphery of the blade portion 2 and a top coating layer (second coating layer) coated on the outside the bonding coating layer. The bonding coating layer are formed of, for example, an MCrAlY alloy (M is Co, Ni, or a combination of these elements), and functions as a metal bonding layer that enhances adhesion between the blade portion 2 and the top coating layer. The top coating layer is coating made of zirconia ($ZrO_2$) ceramic, and functions as a thermal barrier coating (TBC) film having a thermal barrier property. Accordingly, heat resistance of the turbine blade 1 can be improved.

However, deterioration may occur in the protective layer of the turbine blade 1 which has been exposed to a high temperature environment for a long period of time. Therefore, after the turbine blade 1 has been used for a certain period, a maintenance (reproduction) work is required in which, after the protective layer is removed once from the turbine blade 1, new coating is applied thereto again. A series of processes for removing the protective layer in the maintenance (reproduction) work of the turbine blade 1 is described below with reference to FIG. 2 to FIG. 4.

Figure 2:
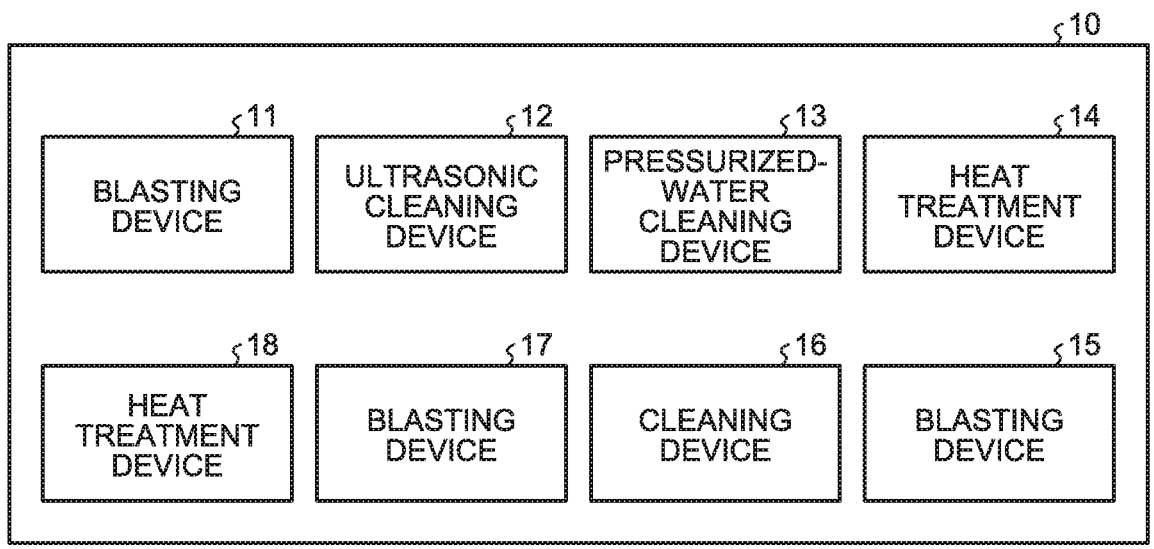
FIG. 2 a schematic diagram illustrating a protective-layer removing system that performs a protective-layer removing process as the turbine blade maintenance method according to the embodiment of the present invention.

FIG. 2 is a schematic diagram illustrating a protective-layer removing system 10 that performs a protective-layer removing process as the turbine blade maintenance method according to the embodiment of the present invention. The protective-layer removing system 10 includes a blasting device 11 that applies blast treatment to the turbine blade 1 for removing the top coating layer, an ultrasonic cleaning device 12 that applies ultrasonic cleaning treatment to the turbine blade 1, a pressurized-water cleaning device 13 that applies pressurized-water cleaning to the turbine blade 1, a heat treatment device 14 that applies heat treatment for removing residual stress to the turbine blade 1, a blasting device 15 that applies blast treatment for removing an oxide film to the turbine blade 1, a cleaning device 16 that applies pickling treatment or the like for removing the bonding coating layer to the turbine blade 1, a blasting device 17 that applies blast treatment for cleaning the turbine blade 1, and a heat treatment device 18 that applies heat treatment for conducting a heat tinting test to the turbine blade 1. Note that the blasting devices 11, 15, and 17 can function as any one of the devices.

FIG. 3 is a flowchart illustrating an example of the protective-layer removing process. In the protective-layer removing process, a top coating-layer removing process (second coating-layer removing process) for removing the top coating layer coated on the outer periphery is first performed by applying the blast treatment to the turbine blade 1 using the blasting device 11 (step S11). In the present embodiment, the blast treatment is performed using an alumina projection material. Accordingly, the top coating layer being ceramic coating can be favorably removed. The projection material to be used for the blast treatment is not limited to the alumina projection material.

In the top coating-layer removing process at Step S11, water-soluble scale adhering to the external surface of the top coating layer of the turbine blade 1 can be removed together with the top coating layer during operation of the gas turbine. However, water-soluble scale adhering to the inner wall surfaces of the internal cooling flow channels 5, the platform 3, and the shank 4 cannot be removed by the top coating-layer removing process. In this state, if heat treatment for removing residual stress (Step S13) described later is applied to the turbine blade 1, high-temperature corrosion may occur in places to which the water-soluble scale adheres. This high-temperature corrosion may cause a damage in the turbine blades 1 during re-operation of the gas turbine. Therefore, it is required to remove water-soluble scale reliably from the turbine blade 1 before performing the heat treatment, so as to prevent occurrence of the high-temperature corrosion, particularly for the turbine blade 1 of the present embodiment that is used in the front stages and exposed to a high temperature. Therefore, in the protective-layer removing process according to the present embodiment, a fouling cleaning process illustrated in FIG. 4 is performed using the ultrasonic cleaning device 12 and the pressurized-water cleaning device 13 (Step S12), subsequent to the top coating-layer removing process. The fouling cleaning process is described later in detail. By performing the fouling cleaning process, water-soluble scale adhering to the turbine blade 1 can be favorably removed.

After performing the fouling cleaning process, a residual-stress removing process is performed in which heat treatment for removing the residual stress is applied to the turbine blade 1 using the heat treatment device 14 (Step S13). In the residual-stress removing process, by applying the heat treatment to the turbine blade 1 using a vacuum heat treatment device 14, the residual stress is removed from the turbine blade 1. Accordingly, occurrence of stress corrosion cracking in the turbine blade 1 can be favorably suppressed by the pickling treatment in a bonding coating-layer removing process (Step S15) described later. Next, an oxide film removing process is performed in which an oxide film generated in the turbine blade 1 by the heat treatment in the residual-stress removing process is removed by the blast treatment of the blasting device 15 (Step S14). Accordingly, the effect of the pickling treatment in the bonding coating-layer removing process (Step S15) described later can be improved.

Subsequently, the pickling treatment is applied to the turbine blade 1 using the cleaning device 16, and the bonding coating-layer removing process for removing the bonding coating layer from the blade portion 2 (first coating-layer removing process) is performed (Step S15). In the bonding coating-layer removing process, by immersing the turbine blade 1 in a liquid basin (not illustrated) in which a highly acidic cleaning solution (for example, hydrochloric acid) contained in the cleaning device 16 is filled, the bonding coating layer is removed from the turbine blade 1. After the pickling treatment, cleaning treatment using water and neutralization treatment using an alkaline cleaning solution are applied to the turbine blade 1 by the cleaning device 16, and after the highly acidic cleaning solution adhering to the turbine blade 1 is removed, the turbine blade 1 is subjected to the next process.

Further, the blast treatment is applied to the turbine blade 1 using the blasting device 17, and a cleaning process to clean the turbine blade 1 is performed (Step S16). The cleaning process is performed in order to remove a reactive layer generated on the external surface of the turbine blade 1 due to the pickling treatment in the bonding coating-layer removing process at Step S15 and residues of the bonding coating layer that have not been completely removed by the pickling treatment. Accordingly, the external surface of the turbine blade 1 can be cleaned, thereby enabling to conduct the heat tinting test (heat tinting) described later more properly.

A part of blasted particles used in the cleaning process described above may enter into the internal cooling flow channels 5 of the turbine blade 1, and stick to the inner wall surfaces by the highly acidic cleaning solution remaining in the internal cooling flow channels 5. Therefore, in the protective-layer removing process according to the present embodiment, the fouling cleaning process illustrated in FIG. 4 is performed again using the ultrasonic cleaning device 12 and the pressurized-water cleaning device 13 (Step S17), in order to remove the blasted particles adhering in the internal cooling flow channels 5 after performing the cleaning process (Step S16). The fouling cleaning process is described later in detail. By performing the fouling cleaning process, the blasted particles adhering in the internal cooling flow channels 5 of the turbine blade 1 can be favorably removed.

After performing the fouling cleaning process, the heat tinting treatment (heat tinting) for testing whether the protective layer (bonding coating layer) does not remain in the turbine blade 1 is applied to the turbine blade 1 using the heat treatment device 18 (Step S18), to determine whether removal of the protective layer (bonding coating layer) has been completed (Step S19). At Step S19, by performing visual check regarding the tinted state of the external surface of the heated turbine blade 1, the presence of the protective layer (bonding coating layer) is checked. If it is determined that removal of the protective layer (bonding coating layer) has not been completed by the visual check, Step S15 and its subsequent steps are repeated again. If it is determined that removal of the protective layer (bonding coating layer) has not been completed by the visual check, instead of repeating Step S15 and its subsequent steps, removal treatment of the protective layer (bonding coating layer) using a grinding tool such as a grinder can be performed. On the other hand, if it is determined that removal of the protective layer (bonding coating layer) has been completed, the protective-layer removing process is finished. Thereafter, a damage maintenance work and a re-coating work of the protective layer are performed to the turbine blade 1 according to need, and if the maintenance work has been completed, the turbine blade 1 is reinstalled in the gas turbine.

Subsequently, the fouling cleaning process performed at Steps S12 and S17 are described in detail with reference to FIG. 4. In the following descriptions, "fouling" refers to the water-soluble scale adhering to the turbine blade 1 during operation of the gas turbine in the fouling cleaning process performed at Step S12, and refers to the blasted particles used in the cleaning process at Step S16 in the fouling cleaning process performed at Step S17.

In the fouling cleaning process, the turbine blade 1 is first supported so that the longitudinal direction (the up-and-down direction in FIG. 1) is along the vertical direction (step S21). At this time, the blade tip 2T of the turbine blade 1 is on the upper side in the vertical direction. However, "the longitudinal direction is along the vertical direction" includes not only a case where the longitudinal direction and the vertical direction coincide with each other, but also a case where the longitudinal direction has a certain angle with respect to the vertical direction, that is, the turbine blade 1 is inclined with a certain angle.

Next, ultrasonic cleaning treatment in which the turbine blade 1 supported as described above is cleaned by the ultrasonic cleaning device 12 is performed (Step S22). In the present embodiment, the ultrasonic cleaning device 12 includes a water basin in which a transmitter and an oscillator are installed (each of which is not illustrated). In the ultrasonic cleaning treatment, the turbine blade 1 is immersed in the water basin in which the transmitter and the oscillator are installed, and ultrasonic waves are generated and conducted in the water basin by the transmitter and the oscillator, thereby enabling to peel fouling adhering to the surface of the turbine blade 1. Accordingly, fouling on the inner wall surfaces of the internal cooling flow channels 5 can be favorably peeled. Further, in this treatment, fouling on the external surface of the turbine blade 1 can be also peeled. Particularly in the fouling cleaning process (the scale cleaning process) at Step S12, this treatment effectively works in that the water-soluble scale adhering to the external surface of the turbine blade 1 where the top coating layer is not applied, such as the platform 3 and the shank 4, can be peeled. After performing the ultrasonic cleaning treatment, the turbine blade 1 pulled out from the water basin is delivered to the next process in the supported posture at Step S21. In this manner, by performing the ultrasonic cleaning treatment in a state where the turbine blade 1 is supported so that the longitudinal direction is along the vertical direction, immersion of the turbine blade 1 into the water basin and pulling out of the turbine blade 1 from the water basin can be performed more easily.

Subsequently, the pressurized-water cleaning treatment in which cleaning is performed by spraying pressurized water into the internal cooling flow channels 5 of the turbine blade 1 using the pressurized-water cleaning device 13 is performed (Step S23). In the present embodiment, in a state where the turbine blade 1 is supported so that the longitudinal direction is along the vertical direction and the blade tip 2T is on the upper side in the vertical direction, spray nozzles of the pressurized water are inserted into the respective openings in the blade tips 2T of the internal cooling flow channels 5, and the pressurized water is sprayed directly into the internal cooling flow channels 5. Accordingly, fouling remaining in the internal cooling flow channels 5, including the fouling that cannot be peeled by the ultrasonic cleaning treatment, is washed away evenly from the blade tip 2T to the blade root by the pressurized water (peeled off from the inner wall surfaces), and is discharged to the outside of the turbine blade 1 (the internal cooling flow channels 5) via the openings in the blade root. This treatment is preferable for removing fouling from the blade including complicated internal cooling flow channels such as the serpentine flow channels of the turbine blade 1 according to the present embodiment. The spray nozzles of pressurized water do not necessarily have to be inserted into the openings of the internal cooling flow channels 5 (can be sprayed from a place away from the openings). Further, in this treatment, the pressurized water can be sprayed not only to the internal cooling flow channels 5 but also toward the outer periphery of the turbine blade 1.

In the pressure water cleaning treatment, as described above, pressurized water is sprayed into the internal cooling flow channels 5 from the openings in the blade tip 2T located at the upper end with respect to the vertical direction, in a state where the turbine blade 1 is supported (oriented) so that the longitudinal axis of the turbine blade extends along the vertical direction. Accordingly, fouling in the internal cooling flow channels 5 can be washed away from the upper side to the lower side in the vertical direction and removed more favorably. Further, the first ultrasonic cleaning treatment and the first pressurized-water cleaning treatment (Steps S22 and S23) when fouling remains in a large amount in the internal cooling flow channels 5 are performed in a state where the turbine blade 1 is supported (oriented) so that the blade tip 2T is at the upper end with respect to the vertical direction. Accordingly, when the turbine blade 1 is pulled out from the water basin in the ultrasonic cleaning treatment and when the pressurized-water cleaning treatment is performed, it can be favorably suppressed that fouling clogs the internal cooling flow channels 5 on the blade tip 2T side, where the flow channels are narrowed down as compared with the blade root side.

Further, a support direction (orientation) is switched so that the upper and lower ends in the vertical direction of the turbine blade 1 are inverted (Step S24), the ultrasonic cleaning treatment and the pressurized-water cleaning treatment are performed again (a further cycle) (Steps S25 and S26), and lastly, the turbine blade 1 is put in hot water and air is blown to the turbine blade 1 (Step S27), to finish the fouling cleaning process. In this manner, by repeating the ultrasonic cleaning treatment and the pressurized-water cleaning treatment twice, fouling can be more favorably removed from the turbine blade 1. In addition, in the present embodiment, after the support direction is switched so that the upper and lower sides in the vertical direction of the turbine blade 1 are inverted at Step S24, the second ultrasonic cleaning treatment and the second pressurized-water cleaning treatment are performed. That is, in the pressurized-water cleaning treatment at Step S23, pressurized-water is sprayed from the openings in the blade tip 2T into the internal cooling flow channels 5, whereas in the pressurized-water cleaning treatment at Step S26, pressurized water is sprayed from the openings in the blade root into the internal cooling flow channels 5. As a result, because the flow direction of pressurized water to be supplied into the internal cooling flow channels 5 can be changed before and after the pressurized-water cleaning treatment for the first time and the second time, fouling in the internal cooling flow channels 5 can be removed quite favorably.

In this manner, in the protective-layer removing process according to the present embodiment, by performing the fouling cleaning process (the scale cleaning process) at Step S12, water-soluble scale adhering to the portion to which the top coating layer is not applied, mainly in the internal cooling flow channels 5, can be favorably removed by a simpler method that does not use complicated and various types of chemical treatment and water washing treatment, before applying heat treatment to the turbine blade 1 in the residual-stress removing process at Step S13. Further, as described above, the water-soluble scale adhering to the portion to which the top coating layer is applied has been removed together with the top coating layer in the top coating-layer removing process. Therefore, in the heat treatment for removing residual stress, occurrence of high-temperature corrosion in the turbine blade 1 can be favorably suppressed.

In the protective-layer removing process according to the present embodiment, by performing the fouling cleaning process (a blasted-particles cleaning process) at Step S17, blasted particles used in the cleaning process at Step S16 can be favorably removed from the internal cooling flow channels 5 of the turbine blade 1 during the period until a series of processes for removing the protective layer from the turbine blade 1 are completed. As a result, in the maintenance work of the turbine blade 1 performed after the protective-layer removing process and a reinstallation work of the turbine blade 1 after completion of the maintenance work, occurrence of a trouble caused by the blasted particles remaining in the turbine blade 1 can be favorably suppressed.

As described above, in the protective-layer removing process as the turbine blade maintenance method according to the present embodiment of the present invention, the fouling cleaning process (blasted-particles cleaning process) is performed (Step S17). In the fouling cleaning process (blasted-particles cleaning process), the ultrasonic cleaning treatment in which the turbine blade 1 is immersed in the water basin and ultrasonic waves are conducted into the water basin to clean the turbine blade 1 (Steps S22 and S25), and the pressurized-water cleaning treatment in which after performing the ultrasonic cleaning treatment, pressurized water is sprayed into the internal cooling flow channels 5 (Steps S23 and S26) are performed at least once (step S17) after the bonding coating-layer removing process of removing the bonding coating layer (first coating layer) by chemical treatment (Step S15) and the cleaning process of cleaning the turbine blade 1 by blast treatment (Step S16), and then the heat tinting process (Steps S18 and S19) is performed. Accordingly, even if the blasted particles used for the blast treatment in the cleaning process enter the internal cooling flow channels 5 of the turbine blade 1 and adhere to the inner wall surface, the blasted particles can be peeled favorably from the inner wall surface of the internal cooling flow channels by the ultrasonic cleaning treatment. The blasted particles remaining in the internal cooling flow channels 5 can be reliably removed by the pressurized-water cleaning treatment. Therefore, in the maintenance process of the turbine blade 1 including the internal cooling flow channels 5 for circulating the refrigerant, the blasted particles can be more favorably removed from inside of the turbine blade 1 during the period until the series of processes for removing the protective layer from the turbine blade 1 is completed. Note that, in the fouling cleaning step (step S17), the treatment in steps S24 to S26 may be omitted, and the ultrasonic cleaning treatment and the pressurized-water cleaning treatment may be performed only once, or the ultrasonic cleaning treatment and the pressurized-water cleaning treatment may be performed three times or more. Note that the pressurized-water cleaning treatment may be performed in the water basin in a case where the water is drained from the water basin after performing the ultrasonic cleaning treatment.

In the protective layer removing process of the embodiment, the turbine blade 1 is a rotor blade, the internal cooling flow channels 5 open in the blade tip 2T and the blade root of the turbine blade 1, and in the pressurized-water cleaning treatment, pressurized water is sprayed into the internal cooling flow channels 5 from any one of the openings in the blade tip 2T and the openings in the blade root. As a result, the blasted particles adhering to the internal cooling flow channels 5 can be favorably removed evenly from the blade tip 2T to the blade root. Note that application of the present invention is not limited to the rotor blade. In a case of applying the present invention to a turbine vane, the pressurized water may just be supplied from an opening portion through which the pressure water is suppliable to the internal cooling passage.

In the protective layer removing process of the embodiment, in the pressurized-water cleaning treatment, pressurized water is sprayed from one of the openings in the blade tip 2T and the openings in the blade root in a where the turbine blade 1 is supported so that the longitudinal direction is along the vertical direction, one of the openings being located on an upper side in a vertical direction. As a result, the blasted particles adhering to the internal cooling flow channels 5 can be washed away from the upper side to the lower side in the vertical direction and removed favorably by spraying the pressurized water. Note that, in the present embodiment, the ultrasonic cleaning treatment and the pressurized-water cleaning treatment are performed in a state where the turbine blade 1 is supported so that the longitudinal direction is along the vertical direction. However, both or one of the ultrasonic cleaning treatment and the pressurized-water cleaning treatment may be performed in a state where the turbine blade 1 is supported so that the longitudinal direction is along a horizontal direction.

In the protective layer removing process of the embodiment, in the fouling cleaning process (blasted-particles cleaning process), after a support direction is switched (Step S24) so that upper and lower sides in the vertical direction of the turbine blade 1 are inverted with respect to previous pressurized-water cleaning treatment (Step S23), the net pressurized-water cleaning treatment (step S26) is performed. As a result, when the pressurized-water cleaning treatment is performed plural times, the flow direction of the pressurized water to be supplied into the internal cooling flow channels 5 can be changed. Accordingly, the blasted particles adhering to the internal cooling flow channels 5 can be removed quite favorably. Note that, in the present embodiment, the support direction of the turbine blade 1 is switched before the second ultrasonic cleaning treatment (Step S25). However, the treatment at Step S24 may just be performed at least between the first pressurized-water cleaning treatment (Step S23) and the second pressurized-water cleaning treatment (Step S26). In a case where the ultrasonic cleaning treatment and the pressurized-water cleaning treatment are performed plural times, the treatment at Step S24 may be always omitted, may be performed every time in intervals of each of the pressurized-water cleaning treatments, or may be performed at an arbitrary time. Further, the pressurized-water cleaning treatment may be performed in succession in a case where the treatment at Step S24, that is, switching of the support direction of the turbine blade 1 is performed after the pressurized-water cleaning treatment is performed once.

In the protective layer removing process of the embodiment, in the fouling cleaning process (blasted-particles cleaning process), first pressurized-water cleaning treatment (step S23) is performed in a state where the turbine blade 1 is supported so that the blade tip 2T is on the upper side in the vertical direction. Accordingly, it can be suppressed more favorably that the blasted particles clog the internal cooling flow channels 5 on the blade tip 2T side, where the flow channels are generally narrower down as compared with the blade root side. However, the first pressurized-water cleaning treatment (Step S23) and the first ultrasonic cleaning treatment (Step S22) may be performed in a state where the turbine blade 1 is supported so that the blade root side is on the upper side in the vertical direction.

The protective layer removing process of the embodiment further includes the residual-stress removing process (Step S13) where the heat treatment is performed so as to remove residual stress in the turbine blade 1 before the bonding coating layer (first coating layer) removing process (step S15). Before the residual stress removing process, the fouling cleaning process (scale cleaning process) (step S12) where a scale-removal ultrasonic cleaning treatment (Steps S22 and S25) and a scale-removal pressurized-water cleaning treatment (steps S23 and S26) after the ultrasonic cleaning treatment are performed at least once.

In the protective layer removing process of the embodiment, before the bonding coating layer removing process, the residual stress removing process of performing the heat treatment to remove the stress remaining in the turbine blade 1 is performed. Accordingly, occurrence of stress corrosion cracking in the turbine blade 1 can be favorably prevented in the bonding coating layer removing process. Before the heat treatment for removing the residual stress is applied to the turbine blade 1, the fouling cleaning process (scale cleaning process) of performing, at least once, the ultrasonic cleaning treatment and the pressurized water cleaning treatment to be performed after the ultrasonic cleaning treatment is performed (step S12). Accordingly, the water-soluble scale adhering to the outer periphery of the turbine blade 1 and the inner wall surfaces of the internal cooling flow channels 5 can be peeled favorably by the ultrasonic cleaning treatment. The water-soluble scale remaining in the internal cooling flow channels 5 can be reliably removed by the pressurized-water cleaning treatment. Therefore, before applying the heat treatment to the turbine blade 1, the water-soluble scale adhering to the turbine blade 1 can be favorably removed by the simpler method. Note that, in the fouling cleaning process at Step S12, the water-soluble scale may be removed from the turbine blade 1, using another technique by chemical treatment and washing treatment.

In the protective layer removing process of the embodiment, the turbine blade 1 includes the top coating layer (second coating layer) applied to outside of the bonding coating layer, and the turbine blade maintenance method further includes the top coating layer (second coating layer) removing process (step S11) for removing the top coating layer by blast treatment before the residual-stress removing process (Step S13). Accordingly, the water-soluble scale adhering to the top coating layer is favorably removed together with the top coating layer by the blast treatment for removing the top coating layer before applying the heat treatment for removing the residual stress to the turbine blade 1. Meanwhile, the water-soluble scale adhering to the outer periphery of the turbine blade 1 and the internal cooling flow channels 5 other than to the top coating layer, which cannot be removed by the blast treatment, is favorably removed by the fouling cleaning process (scale cleaning process) before applying the heat treatment for removing the residual stress to the turbine blade 1. In this manner, the turbine blade maintenance method according to the embodiment of the present invention is preferably applied to the turbine blade 1 including the top coating layer.

Note that either the top coating layer removing process (Step S11) or the fouling cleaning process (Step S12) can be performed first, so long as the process is performed before performing the residual-stress removing process (Step S13). Further, the turbine blade maintenance method according to the present invention may be applied to a turbine blade having no top coating layer. In that case, the top coating layer removing process at Step S11 is omitted from the protective layer removing process. However, in the fouling cleaning process at Step S12, the outer periphery of the turbine blade can also be cleaned by the ultrasonic cleaning treatment. Therefore, by performing the fouling cleaning process, the water-soluble scale adhering to the turbine blade having no top coating layer, as well as a blade portion, can be favorably removed.

REFERENCE SIGNS LIST

1 TURBINE BLADE
2 BLADE PORTION

2T BLADE TIP
3 PLATFORM
4 SHANK
5 INTERNAL COOLING FLOW CHANNEL
10 PROTECTIVE LAYER REMOVING SYSTEM
11 BLASTING DEVICE
12 ULTRASONIC CLEANING DEVICE
13 PRESSURIZED-WATER CLEANING DEVICE
14 HEAT TREATMENT DEVICE
15 BLASTING DEVICE
16 CLEANING DEVICE
17 BLASTING DEVICE
18 HEAT TREATMENT DEVICE

The invention claimed is:

1. A turbine blade maintenance method, the turbine blade including a first coating layer as a protective layer applied to an external surface and internal cooling flow channels for circulating a refrigerant, the internal cooling flow channels being open at a blade tip and at a blade root of the turbine blade, the turbine blade maintenance method comprising:
   performing a first coating layer removing process including removing the first coating layer by chemical treatment;
   performing a cleaning process including a blast treatment for cleaning the turbine blade, the blast treatment being performed after the first coating layer removing process;
   after performing the cleaning process, performing a blasted-particles cleaning process including performing the following treatments a plural number of consecutive cycles:
      (i) an ultrasonic cleaning treatment including immersing the turbine blade in a water basin and conducting ultrasonic sound waves into the water basin to clean the turbine blade, and
      (ii) pressurized-water cleaning treatment including spraying pressurized water into the internal cooling flow channels after performing the ultrasonic cleaning treatment; and
   after performing the blasted-particles cleaning process, performing a heat tinting process including heat treatment testing to determine whether the first coating layer remains on the turbine blade
   wherein the pressurized-water cleaning treatment comprises spraying pressurized water into the internal cooling flow channels through one of (A) openings of the internal cooling flow channels in the blade tip and (B) openings of the internal cooling flow channels in the blade root in a state in which the turbine blade is oriented so that a longitudinal axis of the turbine blade extends in the vertical direction with the one of the openings of the internal cooling flow channels being located on an upper end of the turbine blade with respect to the vertical direction, and
   wherein, after completion of each cycle of the pressurized-water cleaning treatment while performing the blasted-particles cleaning process, an orientation of the turbine blade is switched to invert the upper end and a lower end of the turbine blade with respect to the vertical direction before conducting a subsequent cycle of the pressurized-water cleaning treatment.

2. The turbine blade maintenance method according to claim 1, wherein, while performing the blasted-particles cleaning process, a first cycle of the pressurized-water cleaning treatment is performed in a state in which the turbine blade is oriented so that the blade tip is on the upper end in the vertical direction.

3. The turbine blade maintenance method according to claim 1, further comprising:
   performing a residual-stress removing process including performing heat treatment so as to remove residual stress in the turbine blade before performing the first coating layer removing process; and
   before performing the residual stress removing process, performing a scale cleaning process including a scale-removal ultrasonic cleaning treatment and a scale-removal pressurized-water cleaning treatment performed after the scale-removal ultrasonic cleaning treatment.

4. The turbine blade maintenance method according to claim 3, wherein
   the turbine blade includes a second coating layer applied to an exterior of the first coating layer, and
   the turbine blade maintenance method further comprises a second coating layer removing process for removing the second coating layer by blast treatment before the residual-stress removing process.

* * * * *